M. KRAUSE.
HEAT RECORDER.
APPLICATION FILED APR. 27, 1914.

1,152,645.

Patented Sept. 7, 1915.

UNITED STATES PATENT OFFICE.

MARTIN KRAUSE, OF BERLIN, GERMANY.

HEAT-RECORDER.

1,152,645.  Specification of Letters Patent.  Patented Sept. 7, 1915.

Application filed April 27, 1914. Serial No. 834,805.

*To all whom it may concern:*

Be it known that I, MARTIN KRAUSE, engineer, a citizen of the German Empire, and a resident of Berlin, Germany, have invented certain new and useful Improvements in Heat-Recorders; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to a heat-recorder.

In the heating and cooling art there is a great demand for an instrument by which in a simple manner the number of heat units absorbed or furnished by the plant may be ascertained. This result can be obtained by measuring the quantity of liquid passing through the system during a certain period of time, and measuring also the heating or cooling of the liquid in the system. The liquid can be measured by a water meter of a known construction and the heating or cooling of the liquid can be ascertained by means of thermometers suitably situated, at the admission and outlet thereof. These thermometers may be of the mercury type or of the recording type of a known construction.

The quantity of heat absorbed or furnished is represented by a product of the quantity of liquid which has traversed the system in a certain period of time, of the specific heat of the latter and the difference in temperatures.

The present invention consists in a novel means in which the heat units absorbed or furnished by the heating or cooling apparatus are determined by a mere measuring of the surfaces.

A preferred embodiment of my invention is illustrated by way of example in the accompanying drawing, in which:—

Figure 1:
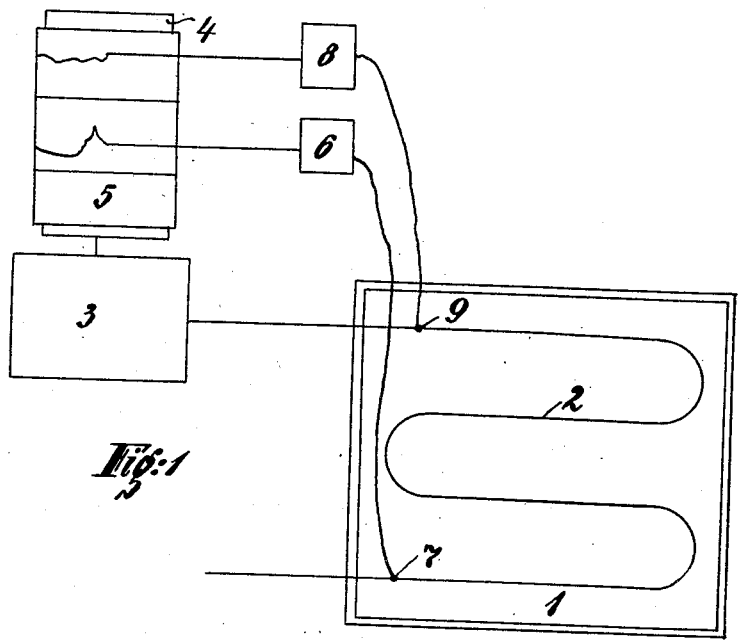
Figure 2:
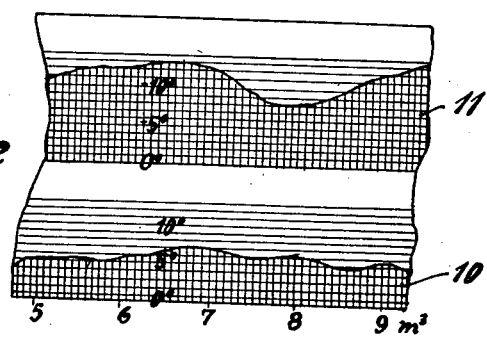
Figure 3:
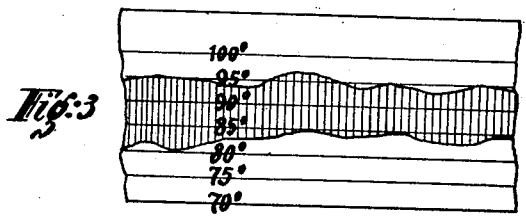

Figure 1 is diagrammatic illustration of the measuring device, and Figs. 2 and 3 the curves recorded thereby, Fig. 3 being a modification.

Referring to Fig. 1, 1 is a space which is intended to be heated or cooled by the tubular coils 2. The coil 2 is traversed by a liquid which operates a liquid meter 3. The latter may be a water meter of a known construction, adapted to actuate the drum 4 in such a manner that the rotation thereof is directly proportional to the point of origin of the traversing quantity of liquid. Together with this drum, a sheet 5 of paper or the like secured to the drum in the known manner, comprises at right angles to the direction of movement, a temperature scale, and in the direction of movement a volume scale. The scales, however, may be dispensed with. If the recording device 6 records the temperature of the liquid entering the heating coil 2 at 7, upon a sheet 5, the surface below the temperature curve comprising at the bottom a straight line passing through the temperature 0° C., represents a measure for the heat of the quantity of liquid admitted to the coil 2, as the quantity of heat corresponds to the product of the volume of the liquid, specific weight, specific heat and temperature. A second recording device 8 records the temperature of the liquid leaving the coil 2 at 9 so that the surface below the temperature curve drawn by the device 8, represents the quantity of heat contained by the leaving liquid. The difference between both surfaces represents the quantity of heat supplied to the space or room by the liquid or the quantity of heat withdrawn therefrom by the said liquid.

Fig. 2 shows a sheet of paper having two temperature curves. The lower hatched surface 10 represents the heat contained by the liquid entering the coil while the upper hatched surface 11 shows the heat contained by the leaving liquid, the difference between these two being a measure for the absorbed quantity of heat. In both thermometers both temperatures may be measured from the same zero point so that the surface comprised between the two temperature curves indicates the difference between both surfaces and thus the supplied number of heat units. Fig. 3 shows a sheet of this kind. The upper line indicates the temperature of the entering liquid while the lower line indicates the temperature of the leaving liquid, the strip of surface comprised between the two lines being a measure of the quantity of heat supplied.

The surfaces corresponding to the individual chambers are closely located with respect to one another so that the surface comprised between the uppermost and lowermost curve, measures the total heat absorbed by the respective chambers.

Having now particularly described and ascertained the nature of said invention and in what manner the same is to be performed, I declare that what I claim is:—

1. An instrument for recording the heat units absorbed in a heating plant, comprising in combination with the heating coil of said plant, a liquid meter adapted to measure the amount of liquid fed to said coil at a predetermined time, a drum rotatably mounted on said meter and adapted to be rotated by said meter in proportion with the passage of the liquid through the same, a recording sheet upon said drum, two recorders, a temperature measuring instrument controlling each of said recorders, and means for connecting one of said measuring instruments to the coil of entrance and the other to the coil of exit of the liquid into and out of said heating coil.

2. An instrument for recording the heat units absorbed in a heating plant, comprising in combination with the heating coil of said plant, a liquid meter adapted to measure the amount of liquid fed to said coil during a predetermined time period, a drum rotatably mounted on said meter adapted to be rotated by said meter in proportion with the passage of the liquid through the same, a recording sheet upon said drum, a temperature scale on said sheet at right angles to the direction of movement of said drum, a volume scale on said sheet in the direction of movement of said drum, two recorders, a temperature measuring instrument controlling each of said recorders, a connection for one of said measuring instruments to the point of entrance and for the other to the point of exit of the liquid into and out of said heating coil for recording on said sheet the temperature currents.

3. An instrument for recording the heat units absorbed in a heating plant comprising in combination with the heating coil of said plant, a meter for the heating medium flowing through said coil, a drum rotated upon said meter in proportion with the amount of liquid passing said meter during a predetermined period of time, a recording sheet upon said drum having a straight line passing through zero, two recorders, means connected to the point of entrance of the heating medium into said coil and to one of said recorders, and means connected to the point of exit of said heating medium and to the other of said recorders adapted to operate said recorders for marking the temperature curves on said sheet so that the space limited by both vurves indicates the difference in temperature.

In testimony whereof I affix my signature in presence of two witnesses.

MARTIN KRAUSE.

Witnesses:
 HENRY HASPER,
 WOLDEMAR HAUPT.